United States Patent
Scarnato et al.

[15] 3,698,162
[45] Oct. 17, 1972

[54] CROP HARVESTING MACHINE

[72] Inventors: Thomas J. Scarnato, Barrington; Martin H. Meyer, Elburn, both of Ill.

[73] Assignee: International Harvester Company, Chicago, Ill.

[22] Filed: April 23, 1970

[21] Appl. No.: 31,110

[52] U.S. Cl. ........................................56/1, 56/14.4
[51] Int. Cl. ....................................A01d 43/00
[58] Field of Search .........56/1 C, 6, 14.4, 14.5, 16.4, 56/172, 503, 157

[56] References Cited

UNITED STATES PATENTS

| | | |
|---|---|---|
| 3,241,300 | 3/1966 | Fell et al. ...................56/1 C X |
| 3,469,378 | 9/1969 | Heesters et al. ..............56/6 X |
| 2,648,943 | 8/1953 | Shafer et al. ..........56/1 C UX |
| 3,473,305 | 10/1969 | Cyr ..........................56/1 C X |
| 3,472,008 | 10/1969 | Hurlburt ..................56/1 C X |
| 3,513,647 | 8/1967 | Johnston et al.............56/14.5 |

*Primary Examiner*—Louis G. Mancene
*Assistant Examiner*—J. A. Oliff
*Attorney*—Floyd B. Harman

[57] ABSTRACT

A harvesting device comprising a platform with rotary mowing devices along its forward edge arranged to sling the material upwardly and rearwardly onto an upwardly and rearwardly sloping platform for delivery of the crops to a pair of conditioning rollers, and a reel cooperating with the mowing devices which functions to feed the material prior to cutting into the mowing devices and after the material is cut sweeping the cut material off the mowing devices and controlling the flow of the material into the hay conditioning rollers.

9 Claims, 4 Drawing Figures

INVENTORS
Thomas J. Scarnato
Martin H. Meyer
BY
John J. Kowalik
ATTY.

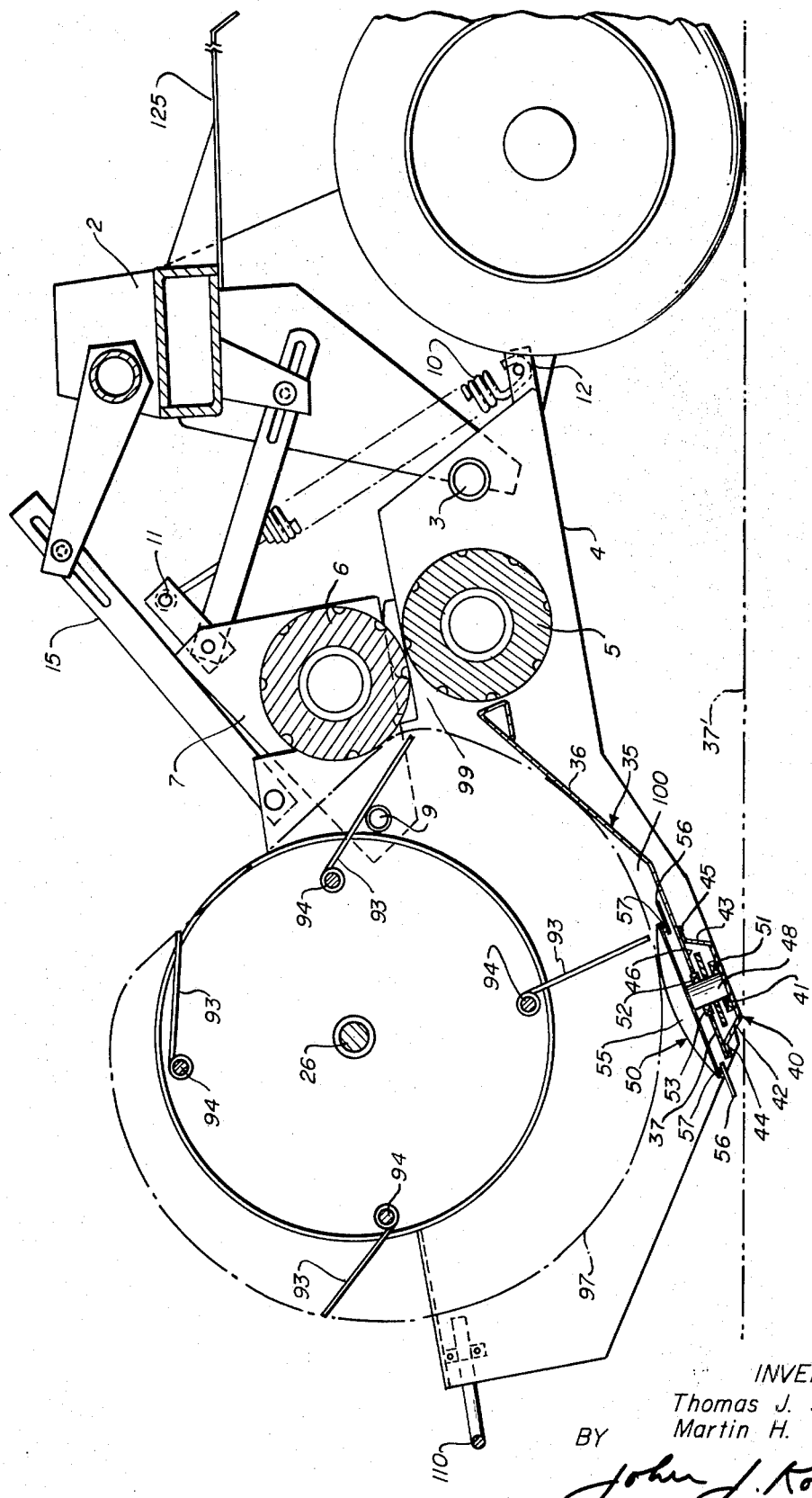

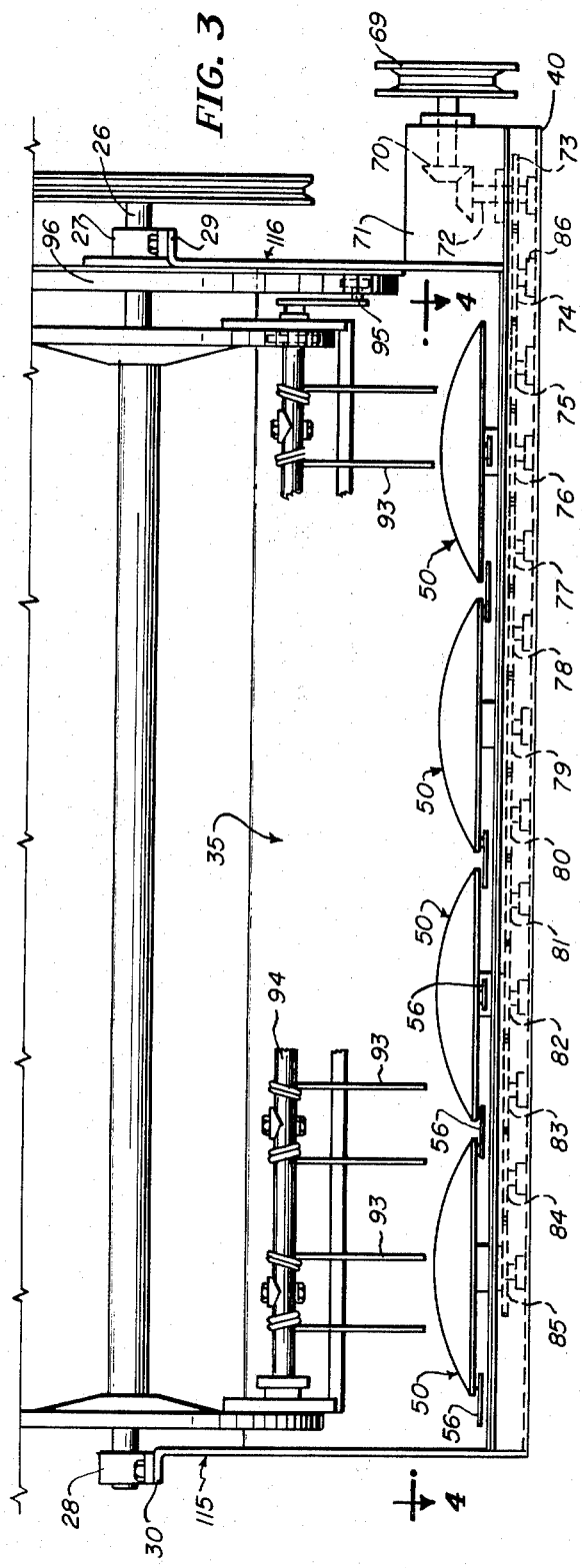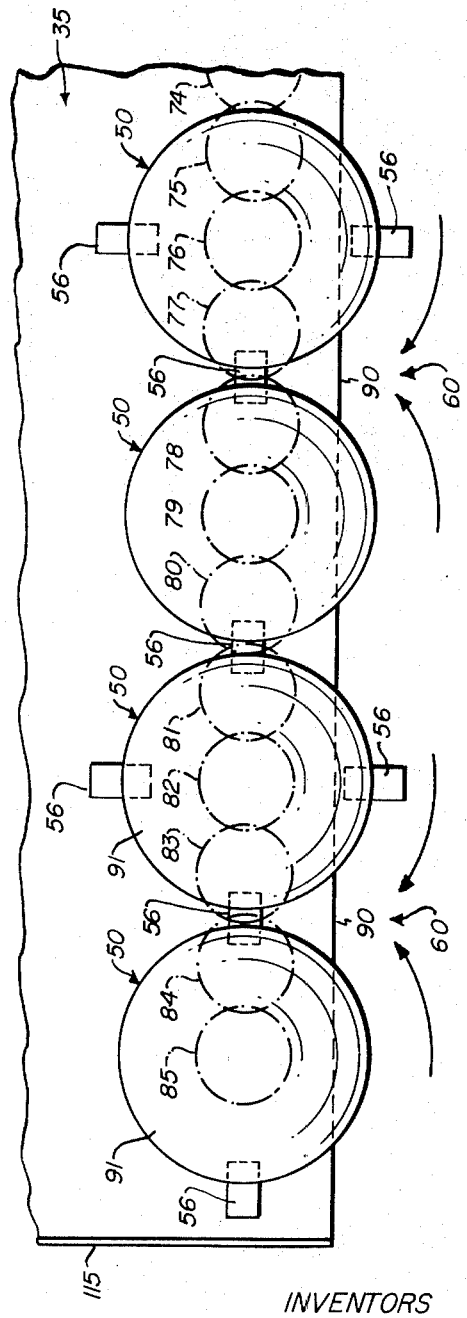

3,698,162

CROP HARVESTING MACHINE

CROSS REFERENCES TO RELATED APPLICATIONS

Attention is directed to copending companion application Thomas J. Scarnato, et al, entitled: HARVESTING MACHINE filed Apr. 23, 1970 Ser. No. 31,111.

DISCUSSION OF THE PRIOR ART

Forage harvesting devices of the type under consideration heretofore utilized a sickle type mower along its forward edge. This type of mower is not self-cleaning and requires the assistance of a companion mechanism usually in the form of a reel. The various crop conditions in which the harvester is operated requires different types of reels and/or different speeds as well as different numbers of raking bars for adequately maintaining an even flow of material. This type of arrangement is expensive and also requires a particular knowledge by the operator in adjusting the reel and speed thereof. This is time consuming and requires extensive reassembling of parts of the reel and/or the rearrangement of the drives in order to properly move the material.

SUMMARY OF THE INVENTION

This invention is primarily directed to a forage harvesting device of the type known commonly as a mower conditioner. In this type of device crops are cut in the field and directly fed into the conditioning rollers and then condensed into windrow.

A general object of the invention is to provide a novel mower conditioner in which a plurality of rotary mowing devices are provided at the leading end of the harvesting platform, which mowing devices are adapted to cut the crops in all known crop conditions and wherein the mowing devices function to convey the material rearwardly into the conditioning rollers.

A more specific object of the invention is to provide a novel harvesting device utilizing rotary mowers of the type having unobstructed upper surfaces which are adapted to support and sling the cut crop material rearwardly into the conditioning rollers and wherein a reel is provided to cooperate with these mowing devices in preventing recirculation of the material and in directing and metering the material into the conditioning rollers.

A broad object of the invention is to provide a novel harvesting machine in which the rotary cutting devices serve as the primary conveying means and wherein the reel functions to properly present the material to these mowing devices and also as auxiliary means for moving the material to the conditioning rollers and wherein the fingers provided on the reel comb through the cut crops behind the cutters to prevent the material from recirculating on the mowing devices.

These and other objects and advantages inherent in and encompassed by the invention will become more readily apparent from the specification and the drawings wherein:

FIG. 2 is a longitudinal cross sectional view taken substantially on the line 2—2 of FIG. 1;

FIG. 3 is a front view, the upper portion being broken away; and

FIG. 4 is a generally horizontal sectional view taken substantially on the line 4—4 of FIG. 3.

DESCRIPTION OF THE INVENTION

Figure 1:
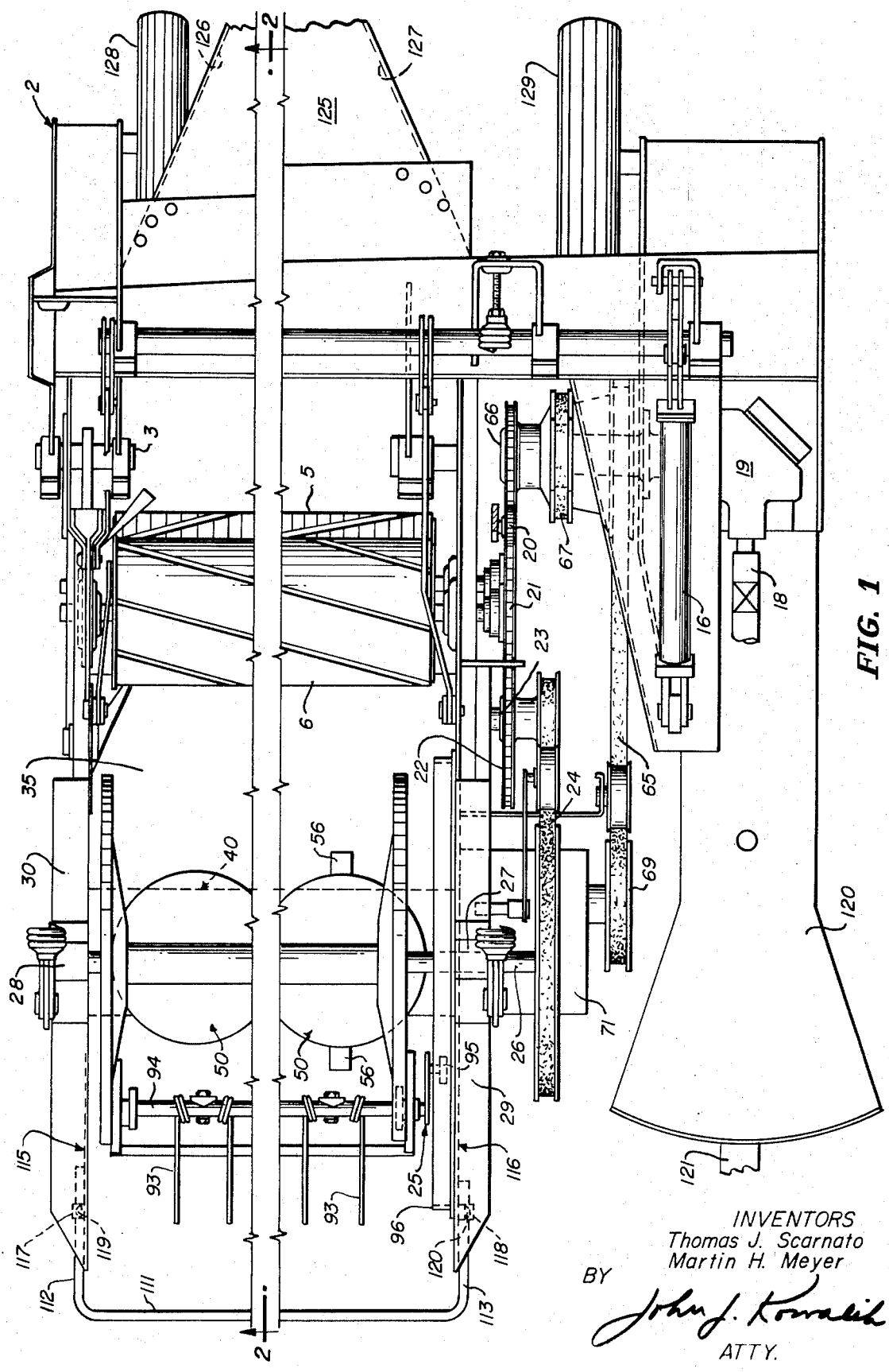
FIG. 1 is a plan view broken apart along its longitudinal center line illustrating the invention.

The harvesting unit 1 of the present invention essentially comprises a wheeled ambulatory framework generally designated 2 which pivotally mounts as at 3 a sub-frame 4 upon which is journaled a transverse substantially horizontal lower roller 5 rotatable on the substantially horizontal axis. The lower roller cooperates with an upper conditioning roller 6 which is rotatably mounted at opposite ends on levers 7. Levers 7 are pivotally mounted on substantially horizontal coaxial pivots 9 to the side elements 29 and 30 of the frame 4 and are spring-biased by springs 10 which are connected as at 11 to the upper rear ends of the respective levers 7, the springs being connected at their lower ends as at 12 to a portion of the framework 4. The position of the upper rollers 6 with reference to the lower roller 5 is controlled by a linkage designated 15 which is controlled by hydraulic ram 16 as described in a copending companion application Thomas J. Scarnato et al for DRIVE ELEMENTS FOR HARVESTERS filed Feb. 5, 1970 Ser. No. 9,022.

The drive for rollers 5 and 6 is taken through a propeller shaft 18 which may be suitably connected to the power take-off of an associated tractor, shaft 18 driving through a gear box 19 to a power train 20 which comprises chain drive 21 driving sprockets connected to the upper and lower rollers and also driving through a suitable sprocket 22 a countershaft 23 which drives belt and pulley drive 24 for driving a reel generally designated 25.

The reel 25 comprises a center shaft 26 to which the drive 24 connects and the shaft 26 is suitably journaled as at 27 and 28 to the side members or panels 29 and 30 of the sub-frame 4. A transverse platform or deck generally designated 35 extends between and intereconnects the side panels 29 and 30 and comprises an upwardly and rearwardly inclined rear portion 36 disposed substantially at about a 45° angle to the ground line designated 37 in FIG. 2. Of course the position of the deck portion 36 will vary depending upon the adjustment of the linkage 15 which may be anywhere from 45° to approximately 25°. The forward portion 37 of the platform or deck 35 is angled from 5° to 20° with respect to the horizontal and is disposed at an obtuse angle with respect to the portion 36 as best seen in FIG. 2. The forward section of the portion 37 is reinforced by a generally U-shaped member generally designated 40 having a bottom wall 41 and a pair of upwardly diverging front and rear walls 42 and 43 with outturned flanges 44 and 45 which are suitably connected as by welding to the underside 46 of the wall portion 37 and forms a box-section therewith. The housing encloses spindles or shafts which carry driving gears for rotating the rotary mowing devices generally designated 50, 50. Each spindle 48 is mounted within a bearing 51 at its lower end and intermediate its ends in a bearing 52. Each bearing 51 is suitably mounted onto the wall 41 and the bearing 52 being suitably mounted and retained in the wall portion 37. Each spindle extends upwardly through an opening 53 in the wall 37 and is connected to an upwardly convexed cover plate 55 which swingably mounts at diametrically opposite sides of the sickle or knife members 56, 56. The axes of pivot of the members 56, 56 are on the pins 57, 57 which are parallel with the axis of the shaft 48 which inclines upwardly and forwardly. It will be observed that the rotors 50,50 are arranged in pairs designated 60, 60 and the rotors of each pair rotate in opposite directions that is toward each other at the forward edge of the machine as best seen in FIG. 4 and the knives thereof 56 of one rotor 50 are displaced 90 degrees from the other, preferably.

The rotors are driven by a power train drive 65 from the output element 66 which is driven through a belt drive 67 from the gear box 19, the element 66 also serving to drive the power train 20. The input to the cutting means is from a pulley 69 through a bevel gear arrangement 70 in a gear box 71 at one end of the housing structure 40. The bevel gear train 70 comprises a vertical output shaft 72 which drives a gear 73 in the housing, gear 73 driving gear 74, gear 74 driving gear 75, gear 75 driving gear 76, gear 76 driving gear 77, gear 77 driving gear 78, gear 78 driving gear 79, gear 79 driving gear 80, gear 80 driving gear 81, gear 81 driving gear 82, gear 82 driving gear 83, gear 83 driving gear 84, and gear 84 driving gear 85. The gears 74 through 85 are each mounted on respective vertical shafts 48 which are mounted in bearings as heretofore described. In operation the crop material is cut toward the convergence 90, 90 of each pair of rotors 60, 60 and is discharged rearwardly immediately after being cut onto the convex top surface 91 of the respective member 55. The spinning of these disks causes the material to slide toward each other in the convergence 90 particularly in view of the convexity of the surfaces 91. Some crops may be carried over the back sides of the surfaces 91.

As best seen in FIG. 2 the reel aids in moving the material off the cutting means by means of a plurality of fingers 93, 93 which are mounted on cam bars 94, 94 controlled by cranks 95 which are guided within a cam track 96 whereby the fingers follow the path shown at 97 in FIG. 2. It will be seen that the peripheral path 97 of the fingers sweep over the top of the surfaces 91 and converges therewith in an area rearwardly of the axis of the respective shafts 48 so that the fingers rake into the material on the back sides of the rotating disks. These fingers as best seen in FIGS. 2 and 3 serve a function of controlling the movement of the material toward the rollers and also serve to prevent the material from recirculating around the respective rotors and being discharged forwardly of the machine. In addition the path of the fingers is such that it approaches the deck portion 36 at a point rearwardly of the disks and sweeps tangentially therealong and tucks the material directly into the nip 99 developed between the rollers 5 and 6. The convergence of the portions of the deck develops a pocket 100 at the obtuse angle between the portions 36 and 37 and serves as a rock and sand trap.

A breakover bar designated 110 is provided at the forward end of the machine said bar being U-shaped in plan view and having a cross member 111 and a pair of rearwardly extending legs 112 and 113 flanking the side portions of the frame 4 and being pivotally secured thereto on coaxial pivots 115, 116 for a vertical adjustment and having brackets 117 and 118 secured thereto the same serving to hold the bar in adjusted vertical and fore and aft positions. The brackets 117 and 118 may comprise clamps which are releasably secured as by bolts 119 and 120 to the respective side sheets 30 and 27. In operation the machine is advanced forwardly by being towed by the left frame member 120 which is connected to a tongue 121 suitably connected to a tractor, as well known to those skilled in the art, through the hitch arrangement. The forward movement of the machine causes the breakover bar 111 to bend the crop material and the reel then sweeps with its fingers the uncut material to the cutters which are inclined, as heretofore stated between 5° and 20°, the cutters then cut the material and the pairs of rotors gather the material toward each other and then spray or fan the material rearwardly as best seen in FIG. 1 between the tines of the reel and along the deck advancing the material to the hay conditioning rolls. The hay conditioning rolls then grasp the material in the nip and discharge it in upward and rearward trajectory against the underside of the deflector 125 between the converging side panels 126 and 127 into a windrow between the supporting wheels 128 and 129 which are disposed at the rear end of the machine.

It will be observed that a novel and effective unit is provided in which the cutter in addition to being a device for mowing the crops also serves as a conveying means as augmented by the action of the reel serving as a supplementary conveying means and which not only prevents the recirculation of the material but also serves the function of controlling the movement of the material upwardly and rearwardly into the conditioning rollers.

What is claims is:

1. In a mower conditioner, an ambulatory frame, a stationary platform thereon having front and rear edges and sloping upwardly and rearwardly from the front edge to the rear edge, a pair of cooperative substantially horizontally disposed crop conditioning rollers mounted on the frame adjacent to said rear edge of the platform, mowing means mounted on the platform adjacent to its forward edge and comprising a plurality of cutters each having a disk mounted for rotation about an upright axis and each presenting an unobstructed upper crop-receiving surface, knife blades mounted in each disk and projective beyond the periphery thereof, said disks disposed in a substantially common plane, said cutters arranged in cooperative pairs rotating in opposite directions toward each other forwardly of the platform and effective to cut the crops and discharge them onto the respective disks, said disks sloping upwardly and rearwardly and rotating at high speeds and serving as conveying means for slinging the cut crops rearwardly and upwardly therefrom onto the platform, and a reel serving as supplementary conveying means mounted from the frame for rotation about a generally horizontal axis above the cutters and having peripheral fingers operative to sweep residual cut material from the rear portions of the disks and the platform and move the crops upwardly and rearwardly over the platform directly into the conditioning rollers.

2. The invention according to claim 1, and said disks having upwardly convexed upper areas operative to inhibit material from climbing thereover as the material is cut.

3. The invention according to claim 1 and said reel comprising a series of cammed bars and said fingers mounted thereon, and said bars positioning said fingers essentially vertically over the disks and having a sweep over said disks downwardly behind the axes of rotation thereof and providing an obstruction to the movement of material from the rear toward the front of the disks.

4. The invention according to claim 3 and said bars positioning the fingers tangentially to the upper of said rollers at the discharge region of the reel with respect to the rollers.

5. The invention according to claim 1 and a housing structure mounted under said platform adjacent to its forward edge, and each cutter having a shaft defining its axis of rotation, said shaft extending below the disk thereof into the housing, and means enclosed in the housing for driving the cutters as aforesaid.

6. The invention according to claim 1 and the knife blades swingably mounted on respective disks and projecting forwardly of the forward end of the platform.

7. The invention according to claim 1 and said rollers comprising a lower roller and an upper roller disposed ahead of the lower roller and developing a downwardly facing nip, and said nip disposed above the plane of said platform and said reel fingers having a sweep path converging with the disks rearwardly of the axis of rotation thereof.

8. The invention according to claim 1 and said disks disposed intermediate the blades and the peripheral sweep of said fingers at elevations adjacent to the ground.

9. The invention according to claim 1 and said disks being dome-like and operative to converge the material therebetween, and said fingers disposed in planes intercepting the peripheries of said disks along chordal planes disposed rearwardly of the axes of rotation of said disks.

* * * * *